United States Patent
Herbst et al.

(10) Patent No.: US 8,217,105 B2
(45) Date of Patent: Jul. 10, 2012

(54) STABILIZED MEDIUM AND HIGH VOLTAGE INSULATION COMPOSITION

(75) Inventors: Heinz Herbst, Lörrach (DE); Markus Kolb, Kandern (DE)

(73) Assignee: BASF SE, Ludwigshafen (DE)

( * ) Notice: Subject to any disclaimer, the term of this patent is extended or adjusted under 35 U.S.C. 154(b) by 423 days.

(21) Appl. No.: 12/311,503

(22) PCT Filed: Oct. 8, 2007

(86) PCT No.: PCT/EP2007/060627
§ 371 (c)(1),
(2), (4) Date: Apr. 1, 2009

(87) PCT Pub. No.: WO2008/046751
PCT Pub. Date: Apr. 24, 2008

(65) Prior Publication Data
US 2010/0036031 A1    Feb. 11, 2010

(30) Foreign Application Priority Data
Oct. 16, 2006   (EP) .................................... 06122326

(51) Int. Cl.
*C08K 5/375* (2006.01)
(52) U.S. Cl. ...................................................... 524/331
(58) Field of Classification Search .................. 524/331
See application file for complete search history.

(56) References Cited

U.S. PATENT DOCUMENTS

| 4,400,429 A | 8/1983 | Barlow et al. |
| 4,612,139 A | 9/1986 | Kawasaki et al. |
| 6,869,995 B2 * | 3/2005 | Caronia et al. ................. 524/330 |

FOREIGN PATENT DOCUMENTS

| JP | 53003700 | | 1/1978 |
| WO | 99/31675 A1 | | 6/1999 |
| WO | 2004/065471 | | 8/2004 |
| WO | WO 2004/065471 | * | 8/2004 |

* cited by examiner

*Primary Examiner* — Robert D. Harlan
(74) *Attorney, Agent, or Firm* — Tyler A. Stevenson

(57) ABSTRACT

The invention describes a composition comprising a) a polyethylene, b) a sulfur-containing phenolic antioxidant, c) a migrating antistatic agent, and d) an organic peroxide. The composition is useful for the preparation of a crosslinked polyethylene as cable insulation of medium and high voltage cables with improved water tree resistance.

10 Claims, No Drawings

STABILIZED MEDIUM AND HIGH VOLTAGE INSULATION COMPOSITION

The present invention relates to compositions comprising a polyethylene, a sulfur-containing phenolic antioxidant, a migrating antistatic agent, and an organic peroxide. The compositions are useful for the preparation of a crosslinked polyethylene as cable insulation of medium and high voltage cables with improved water tree resistance.

Medium and high voltage insulated cables are known to suffer from shortened life when installed in an environment where the insulation is exposed to water, for example underground or locations of high humidity. The shortened life has been attributed to the formation of water trees which occur when an organic polymeric material is subjected to an electrical field over a long period of time in the presence of water in liquid or vapor form. The formation of water trees is believed to be caused by a complex interaction of the AC electrical field, moisture, time, and the presence of ions. The net result is a reduction in the dielectric strength of the insulation.

U.S. Pat. No. 6,869,995 B2 discloses an electric power cable insulated with a polyethylene composition having an improved resistance to water trees. The composition comprises (i) a polyethylene, (ii) 4,4'-thiobis(2-methyl-6-tert-butylphenol), 4,4'-thiobis(2-tert-butyl-5-methylphenol) and 2,2'-thiobis(6-tert-butyl-4-methylphenol) or a mixture of said compounds; and (iii) a polyethylene glycol having a molecular with in the range of about 1000 to about 100,000.

US-A-2002/0198344 discloses a polyethylene composition for use as insulation for wire and cable that has improved scorch resistance comprising (a) a polyethylene, (b) a scorch inhibitor having a melting point below 50° C. at atmospheric pressure, and (c) an organic peroxide.

The known compositions for the preparation of a crosslinked polyethylene as cable insulation of medium and high voltage cables with water tree resistance do not yet completely satisfy in every respect the high requirements which an insulation material is required to meet. Especially the co-use of polyethylene glycol gives an exudation problem of the insulation material.

It has now been found that the replacement of the polyethylene glycol with a migrating anti-static agent improves the stability of the cable insulation of medium and high voltage cables against water trees.

The present invention therefore provides a composition comprising a) a polyethylene, b) a sulfur-containing phenolic antioxidant, c) a migrating antistatic agent, and d) an organic peroxide.

Preferably, the sulfur-containing phenolic antioxidant is a compound of the formula I, II or III

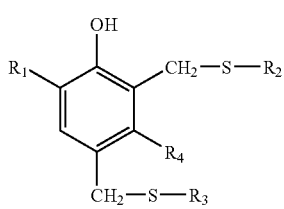
(I)

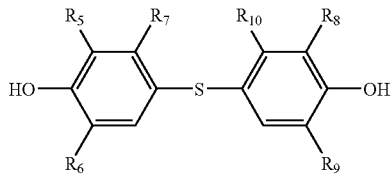
(II)

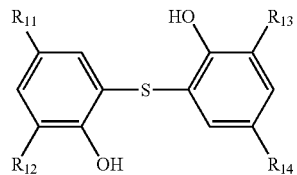
(III)

wherein $R_1$ is $C_1$-$C_{20}$alkyl; or with $C_2$-$C_{20}$alkenyl, $C_3$-$C_{20}$alkinyl, $C_5$-$C_9$cycloalkyl, phenyl or tolyl substituted $C_1$-$C_{20}$alkyl;

$R_2$ and $R_3$ independently of each other are $C_1$-$C_{20}$alkyl; with phenyl, hydroxyl, cyano, formyl, acetyl or —O—CO—$R_{15}$ substituted $C_1$-$C_{20}$alkyl; $C_2$-$C_{20}$alkenyl, $C_3$-$C_{20}$alkinyl, $C_5$-$C_9$cycloalkyl; or with hydroxyl, phenyl, 4-chlorophenyl, 2-methoxycarbonylphenyl, p-tolyl, 1,3-benzthiazol-2-yl, —(CHR$_{16}$)$_n$COOR$_{17}$ or —(CHR$_{16}$)$_n$CONR$_{18}$R$_{19}$ substituted $C_5$-$C_9$cycloalkyl;

$R_4$ is hydrogen or methyl, $R_5$ is hydrogen, $C_1$-$C_{12}$alkyl or cyclohexyl, $R_6$ is $C_1$-$C_{12}$alkyl or cyclohexyl, $R_7$ is hydrogen or $C_1$-$C_4$alkyl, $R_8$ is $C_1$-$C_{12}$alkyl or cyclohexyl, $R_9$ is hydrogen, $C_1$-$C_{12}$alkyl or cyclohexyl, $R_{10}$ is hydrogen or $C_1$-$C_4$alkyl, $R_{11}$ is $C_1$-$C_4$alkyl, $R_{12}$ is $C_1$-$C_{12}$alkyl or cyclohexyl, $R_{13}$ is $C_1$-$C_{12}$alkyl or cyclohexyl, $R_{14}$ is $C_1$-$C_4$alkyl, $R_{15}$ is $C_1$-$C_{20}$alkyl, $R_{16}$ is hydrogen or $C_1$-$C_6$alkyl, $R_{17}$ is $C_1$-$C_{20}$alkyl; with oxygen or sulfur interrupted $C_3$-$C_{20}$alkyl; $C_5$-$C_9$cycloalkyl, phenyl, benzyl or tolyl, $R_{18}$ and $R_{19}$ are independently of each other hydrogen or $C_1$-$C_6$alkyl, and n is 1 or 2.

Alkyl having up to 20 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl.

$C_2$-$C_{20}$alkenyl radicals are, for example, vinyl, allyl (prop-2-enyl), but-3-enyl, pent-4-enyl, hex-5-enyl, oct-7-enyl, dec-9-enyl or dodec-11-enyl.

$C_3$-$C_{20}$alkinyl radicals are, for example, propargyl, but-3-inyl, hex-5-inyl, oct-7-inyl, dec-9-inyl, dodec-11-inyl, tetradec-13-inyl, hexadec-15-inyl, octadec-17-inyl or eicos-19-inyl.

$C_5$-$C_9$cycloalkyl radicals are, for example, cyclopentyl, cyclohexyl, cycloheptyl, cyclooctyl, cyclononyl, and in particular cyclohexyl.

$C_1$-$C_{20}$alkyl radicals substituted with phenyl are, for example, benzyl, phenethyl, α-methylbenzyl, α,α-dimethylbenzyl, phenylbutyl, phenyl-α,α-dimethylpropyl, phenylhexyl, phenyl-α,α-dimethylbutyl, phenyloctyl or phenyl-α,α-dimethylhexyl.

$C_1$-$C_{20}$alkyl radicals substituted by one or two hydroxyl groups are, for example, 2-hydroxyethyl, 2-hydroxypropyl, 2-hydroxybutyl, 2-hydroxyhexyl, 2-hydroxyoctyl, 2-hydroxydecyl, 2-hydroxydodecyl, 2-hydroxytetradecyl, 2-hydroxyhexadecyl, 2-hydroxyoctadecyl, 2-hydroxyeicosyl or 2,3-dihydroxypropyl.

$C_1$-$C_{20}$alkyl radicals substituted by phenyl and hydroxy are, for ex. 1-phenyl-2-hydroxyethyl.

$C_1$-$C_{20}$alkyl radicals substituted by cyano are, for example, 2-cyanoethyl.

$C_3$-$C_{20}$alkyl interrupted by one to five oxygen or sulfur are, for example, 3-oxypropyl, 3-thiapropyl, 3-oxobutyl, 3-thiabutyl, 3-oxapentyl, 3-thiapentyl, 3,6-dioxaheptyl, 3,6,9-trioxadecyl or 3,6,9,12,15,18 hexaoxanonadecyl.

Interesting compositions comprise as sulfur-containing phenolic antioxidant a compound of the formula I, wherein $R_2$ and $R_3$ independently of each other are $C_6$-$C_{18}$alkyl.

Preferred compositions comprise as sulfur-containing phenolic antioxidant a compound of the formula II or III, wherein at least one of the radicals $R_5$, $R_6$, $R_8$, $R_9$, $R_{12}$ or $R_{13}$ is tert-butyl.

Preference is also given to compositions comprising as sulfur-containing phenolic antioxidant a compound of the formula I, II or III, wherein $R_1$ is methyl, $R_2$ and $R_3$ independently of each other are $C_8$-$C_{12}$alkyl, $R_4$ is hydrogen, $R_5$ is hydrogen or $C_1$-$C_4$alkyl, $R_6$ is $C_1$-$C_4$alkyl, $R_7$ is hydrogen or methyl, $R_8$ is $C_1$-$C_4$alkyl, $R_9$ is hydrogen or $C_1$-$C_4$alkyl, $R_{10}$ is hydrogen or methyl, $R_{11}$ is methyl, $R_{12}$ is $C_1$-$C_4$alkyl, $R_{13}$ is $C_1$-$C_4$alkyl, and $R_{14}$ is methyl.

Particular preference is given to compositions comprising as sulfur-containing phenolic anti-oxidant the compounds of the formula A, B, C, D and E.

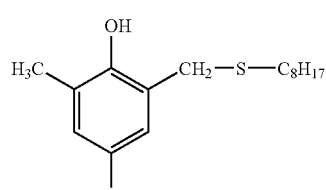

(A)

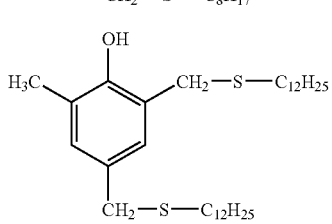

(B)

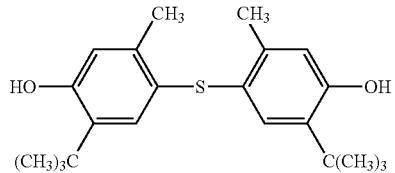

(C)

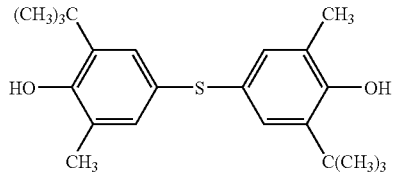

(D)

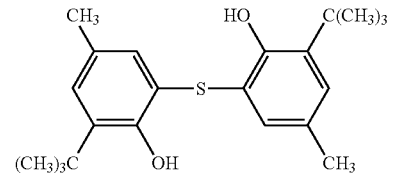

(E)

The compounds of the formula A, B, C, D and E are commercially available as for example Irgastab Cable KV10 (RTM), Irganox 1726 (RTM), Irganox 415 (RTM), Ethanox 736 (RTM) [available by Albemarle] and Irganox 1081 (RTM) by Ciba Specialty Chemicals Inc.

The compounds of the formula I, II and III are disclosed in for example U.S. Pat. No. 6,869,995 B2 or US-A-2002/0198344 and can be prepared by methods known in the art as disclosed for example in the above mentioned references.

Interesting compositions comprise as migrating antistatic agent a compound which is selected from the group consisting of ethoxylated alkylamines, ethoxylated dialkylamines, fatty acid esters, polyethylene glycol esters, polyglycerol esters, glycidyl ester, alkyl sulfonates, pentaerythritol esters, sorbitan esters and diethanol amides of fatty acids or mixtures thereof.

Preferred compositions comprise as migrating antistatic agent a compound which is selected from the group consisting of ethoxylated $C_8$-$C_{18}$alkylamines, ethoxylated $C_8$-$C_{18}$dialkylamines, esters of polyethylene glycol with $C_8$-$C_{18}$carboxylic acids, esters of polyglycerol with $C_8$-$C_{18}$carboxylic acids, esters of glycerol with $C_8$-$C_{18}$carboxylic acids, $C_8$-$C_{18}$alkyl sulfonates, esters of pentaerythritol with $C_8$-$C_{18}$-carboxylic acids, esters of sorbitan with $C_8$-$C_{18}$carboxylic acids and diethanol amides of $C_8$-$C_{18}$carboxylic acids or mixtures thereof.

Preferred compositions comprise as migrating antistatic agent a compound which is selected from the group consisting of ethoxylated $C_8$-$C_{18}$alkylamines, ethoxylated $C_8$-$C_{18}$dialkylamines, polyethylene glycol monolaureate, polyglycerol stearate, glycidyl monostearate, $C_8$-$C_{18}$alkyl sulfonates, pentaerythritol monostearate, pentaerythritol distearate, sorbitan monopalmitate, sorbitan monostearate, sorbitan monooleate and lauric diethanol amide or mixtures thereof.

These migrating antistatic agents are known in the literature and for example commercially available under the tradenames "ATMER" by Uniquema (ICI group).

Interesting compositions comprise as organic peroxide dialkyl peroxides such as dicumyl peroxide, di-tert-butyl peroxide, tert-butyl cumyl peroxide, 2,5-dimethyl-2,5-di(tert-butylperoxy)-hexane, 2,5-dimethyl-2,5-di(tert-amylperoxy)- hexane, 2,5-dimethyl-2,5-di(tert-butylperoxy) hexane-3,2,5-dimethyl-2,5-di(tert-amylperoxy)hexyne-3, α,α-di[(tert-butylperoxy)-isopropyl]-benzene, di-tert-amyl peroxide, 1,3,5-tri-[(tert-butylperoxy)-isopropyl]benzene, 1,3-dimethyl-3-(tert-butylperoxy)butanol, 1,3-dimethyl-3-(tert-amylperoxy) butanol or mixtures thereof.

Other suitable organic peroxides are for example succinic acid peroxide, benzoyl peroxide, tert-butyl peroxy-2-ethyl hexanoate, p-chlorobenzoyl peroxide, tert-butyl peroxy isobutylate, tert-butyl peroxy isopropyl carbonate, tert-butyl peroxy laurate, 2,5-dimethyl-2,5-di(benzoyl peroxy)hexane, tert-butyl peroxy acetate, di-tert-butyl diperoxy phthalate, tert-butyl peroxy maleic acid, cyclohexanone peroxide, tert-butyl peroxy benzoate. Preferred are dialkylperoxides.

The organic peroxides have a decomposition temperature in the range of 100 to 200° C. Especially preferred is dicumyl peroxide, having a decomposition temperature of 150° C.

Polyethylene as component (a) is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester.

Suitable polyethylenes are so-called high pressure polyethylenes. A variety of such polymers are commercially available. The high pressure polyethylenes are preferably homopolymers of ethylene having a density in the range of 0.910 to 0.930 g/cm$^3$. The homopolymer can also have a melt index in the range of about 1 to about 5 g per 10 minutes, and preferably has a melt index in the range of about 0.75 to about 3 g per 10 minutes. Melt index is determined under ASTM D-1238.

The sulfur-containing phenolic antioxidant will preferably be added to the polyethylene in concentrations of 0.01 to 10%, preferably 0.01 to 5%, typically 0.01 to 2.5%, based on the weight of the polyethylene.

The migrating antistatic agent will preferably be added to the polyethylene in concentrations of 0.01 to 10%, preferably 0.01 to 5%, typically 0.01 to 2.5%, based on the weight of the polyethylene.

The organic peroxide will preferably be added to the polyethylene in concentrations of 0.5 to 5%, preferably 1 to 3%, based on the weight of the polyethylene.

Preferably, the amount by weight of the sulfur-containing phenolic antioxidant in respect to the amount by weight of the migrating antistatic agent is 0.5:20 to 20:0.5, typically 1:10 to 10:1.

The total amount of the sulfur-containing phenolic antioxidant and the migrating antistatic agent is preferably 0.01 to 10%, typically 0.05 to 5%, based on the weight of the polyethylene.

In addition to components (a), (b), (c) and (d), the compositions of the invention may comprise further additives, such as for example the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methyl phenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methyl phenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzyl mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzyl phosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of 13-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naph-thyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-ditert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethyl hexyloxy)carbonylethyl]-2'-hydroxyphenyl)benzotriazole, 2-(3'-dodecyl-2'-hydroxy-5'-methylphenyl)

benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-yl phenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methyl indoline, neopentyl tetra(α-cyano-β,β-di-phenylacrylate.

2.5. Nickel compounds, for example nickel complexes of 2,2'-thio-bis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphe-nylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5] decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cyclounaecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2- hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylallyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxy-ylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-hepta-decylnitrone, N-octadecyl-alpha-hexadecylnitrone, nitrone derived from N,N-dialkylhydroxyl-amine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents, biocides, antimicrobials and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butyl benzofuran-2-one, 5,7-di-tert-butyl-3-[4-(2-stearoyl-oxyethoxy)phenyl]benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butyl benzofuran-2-one, 3-(2-acetyl-5-isooctyl phenyl)-5-isooctylbenzofuran-2-one.

The further additives are typically used in concentrations of 0.01 to 10%, based on the total weight of the polyethylene to be treated.

Preferred compositions of the invention comprise as further additives phenolic antioxidants, light stabilizers and/or processing stabilizers.

Optionally, epoxidized soya bean oil can be added in an amount of 1 to 3%, preferably 2%, to the polyethylene against color degradation.

The present invention also relates to a composition in the form of a masterbatch or concentrate comprising each of components (a), (b), (c) and (d) in an amount of from 5 to 90% by weight, totally together 100%.

Components (b), (c) and (d), with or without further additives, can be incorporated in pure form or encapsulated in waxes, oils or polymers into the polyethylene.

In a preferred embodiment the process is carried out in an extruder. Components (b), (c) and (d), and optionally further additives, are mixed with polyethylene and then extruded.

The extrudate is then crosslinked by exposing it to a temperature greater than the decomposition temperature of which the organic peroxide decomposes. The extrusion can be done around one or more electrical conductors to form a medium voltage or high voltage cable. The conductor is either a bare conductor or the conductor is surrounded by primary insulation and/or semicon layer. The cable is then exposed to crosslinking temperatures.

The crosslinking may be carried out in any conventional fashion such as in an oven or in a continuous vulcanization tube, optionally, but not necessarily under nitrogen atmosphere and increased pressure.

The present invention also relates to a process for the preparation of a crosslinked polyethylene composition which comprises heating a composition comprising components (a), (b), (c) and (d).

A further embodiment of the present invention relates to a cable insulation of medium and high voltage cables comprising a crosslinked polyethylene prepared as outlined above.

The stabilized composition is suitable for use as cable insulation of medium and high voltage power cables with improved water tree resistance. A range for medium voltage is 6 kV to 69 kV. "High voltage" relates to a voltage exceeding about 69 kV, especially 100-200 kV.

The preferred components (b), (c) and (d), and optionally further additives, in the process for the preparation of the crosslinked polyethylene are the same as those described for the composition.

The following examples illustrate the invention further. Parts or percentages relate to weight.

EXAMPLE 1

Preparation of Specimen and Measurement of Water Trees Growth in LDPE

The used amount of additives according to Tables 1-3 are premixed with the peroxide (dicumyl peroxide or tert-butyl cumyl peroxide). 300g of polymer pellets [EXXON LD 100 MED, preheated at 70° C. for approximately one hour] and the additive/peroxide mixture is placed into a round flask. This mixture is heated in a water bath at 70° C. and rotated until the additive/peroxide blend is soaked and the pellets appear to be dry. These dry pellets are homogenized on a two roll mill at 115° C. for 15 minutes. 28 g of the roll mill sheet are given on each side of the compression mold (according to ASTM D-6097-00). The compression mold is hold under pressure for 5 minutes at 120° C. followed by 20 minutes at 180° C. Afterwards the mold is cooled down to room temperature under pressure.

Electrolyte (0.01 N NaCl) is filled into a cone which is placed into a grounded bath. The Platinum electrode is dipped into the filled cone and connected to the power supply. A power of 5 kV at a frequency of 6 kHz is applied for 7 days at 65° C. The exposed specimens are placed into with Methylene Blue colored water for 1 hour. The lengths of the visualized water trees are measured via microscope. The comparison with the reference sample gives the Water Tree Growth Rate (WTGR) in percent. The lower the percentage, the better the water tree resistance. The results are summarized in Tables 1-3.

TABLE 1

| Example | Components | WTGR in % |
|---|---|---|
| 1a[a)] | 0.25% of Irganox 415[c)]<br>1.30% of Dicumyl peroxide | 100 |
| 1b[b)] | 0.25% of Irgastab Cable KV 10[d)]<br>0.25% of Atmer 163[e)]<br>1.30% of Dicumyl peroxide | 15 |
| 1c[b)] | 0.25% of Irgastab Cable KV 10[d)]<br>0.50% of Atmer 163[e)]<br>1.30% of Dicumyl peroxide | 22 |
| 1d[b)] | 0.25% of Irgastab Cable KV 10[d)]<br>0.75% of Atmer 163[e)]<br>1.30% of Dicumyl peroxide | 11 |
| 1e[b)] | 0.25% of Irgastab Cable KV 10[d)]<br>1.00% of Atmer 163[e)]<br>1.30% of Dicumyl peroxide | 13 |

TABLE 2

| Example | Components | WTGR in % |
|---|---|---|
| 1f[a)] | 0.25% of Irganox 415[c)]<br>1.90% of tert-Butyl cumyl peroxide | 100 |
| 1g[b)] | 0.25% of Irganox 1081[f)]<br>0.75% of Atmer 163[e)]<br>1.90% of tert-Butyl cumyl peroxide | 75 |
| 1h[b)] | 0.25% of Irgastab Cable KV 10[d)]<br>0.75% of Atmer 163[e)]<br>1.90% of tert-Butyl cumyl peroxide | 17 |
| 1i[b)] | 0.25% of Irganox 1726[g)]<br>0.75% of Atmer 163[e)]<br>1.90% of tert-Butyl cumyl peroxide | 26 |
| 1j[b)] | 0.25% of Irgastab Cable KV 10[d)]<br>0.25% of Atmer 163[e)]<br>0.50% of Atmer 129[e)]<br>1.90% of tert-Butyl cumyl peroxide | 12 |

TABLE 3

| Example | Components | WTGR in % |
|---|---|---|
| 1k[a)] | 0.25% of Irganox 415[c)]<br>1.30% of Dicumyl peroxide | 100 |
| 1l[b)] | 0.25% of Irganox 1081[f)]<br>0.75% of Atmer 163[e)]<br>1.30% of Dicumyl peroxide | 68 |
| 1m[b)] | 0.25% of Irgastab Cable KV 10[d)]<br>0.75% of Atmer 169[e)]<br>1.30% of Dicumyl peroxide | 22 |
| 1n[b)] | 0.25% of Irgastab Cable KV 10[d)]<br>0.75% of Atmer 261[e)]<br>1.30% of Dicumyl peroxide | 37 |
| 1o[b)] | 0.25% of Irgastab Cable KV 10[d)]<br>0.75% of Atmer 110[e)]<br>1.30% of Dicumyl peroxide | 42 |
| 1p[b)] | 0.25% of Irgastab Cable KV 10[d)]<br>0.75% of Atmer 184[e)]<br>1.30% of Dicumyl peroxide | 22 |
| 1q[b)] | 0.25% of Irgastab Cable KV 10[d)]<br>0.75% of Atmer 154[e)]<br>1.30% of Dicumyl peroxide | 52 |
| 1r[b)] | 0.25% of Irgastab Cable KV 10[d)]<br>0.75% of Atmer 181[e)]<br>1.30% of Dicumyl peroxide | 32 |
| 1s[b)] | 0.25% of Irgastab Cable KV 10[d)]<br>0.75% of Atmer 182[e)]<br>1.30% of Dicumyl peroxide | 37 | a) Comparison Example.

b) Examples according to the invention.

c) Irganox 415 (RTM) is a compound of the formula C

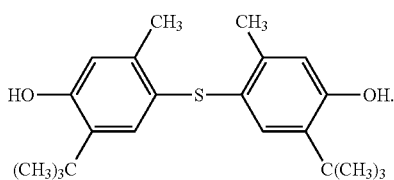

d) Irgastab Cable KV 10 (RTM) is a compound of the formula A

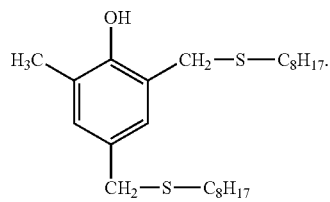

e) Atmer 163 (RTM; ICI Group) is an ethoxylated $C_{13}$-$C_{15}$dialkylamine [Ethanol, 2,2'-iminobis-, N—$C_{13}$-$C_{15}$alkyl derivative].
Atmer 129 (RTM; ICI Group) is a glycidyl monostearate
Atmer 169 (RTM; ICI Group) is an ethoxylated coconut amine
Atmer 261 (RTM; ICI Group) is an ethoxylated tallow amine
Atmer 110 (RTM; ICI Group) is an ethoxylated sorbitan monolaureate
Atmer 184 (RTM; ICI Group) is a polyglycerol stearate
Atmer 154 (RTM; ICI Group) is a polyethylene glycol monolaureate
Atmer 181 (RTM; ICI Group) is a pentaerithritol monostearate
Atmer 182 (RTM; ICI Group) is a pentaerithritol distearate f) Irganox 1081 (RTM) is a compound of the formula E

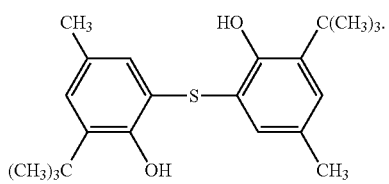

g) Irganox 1726 (RTM) is a compound of the formula B

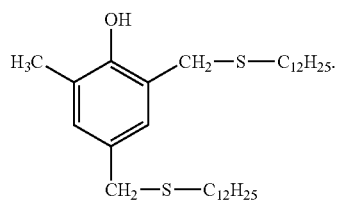

The inventive Examples 1b to 1e, 1g to 1j, and 1l to 1s clearly show in comparison to Examples 1a, 1f and 1k according to the state of the art stabilization a remarkable reduced Water Tree Growth Rate.

What is claimed is:

1. A composition comprising
   a) a polyethylene,
   b) a sulfur-containing phenolic antioxidant,
   c) a migrating antistatic agent, and
   d) an organic peroxide.
where the sulfur-containing phenolic antioxidant is of formula I

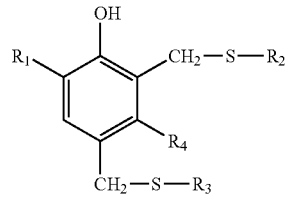

where
$R_1$ is $C_1$-$C_{20}$alkyl; or is $C_2$-$C_{20}$alkenyl, $C_3$-$C_{20}$alkinyl, $C_5$-$C_9$cycloalkyl, phenyl or tolyl substituted $C_1$-$C_{20}$alkyl;

$R_2$ and $R_3$ independently of each other are $C_1$-$C_{20}$alkyl; phenyl, hydroxyl, cyano, formyl, acetyl or —O—CO—$R_{15}$ substituted $C_1$-$C_{20}$alkyl; $C_2$-$C_{20}$alkenyl, $C_3$-$C_{20}$alkinyl, $C_5$-$C_9$cycloalkyl; or hydroxyl, phenyl, 4-chlorophenyl, 2-methoxycarbonylphenyl, p-tolyl, 1,3-benzthiazol-2-yl, —(CHR$_{16}$)$_n$COOR$_{17}$ or —(CHR$_{16}$)$_n$CONR$_{18}$R$_{19}$ substituted $C_5$-$C_9$cycloalkyl;

$R_4$ is hydrogen or methyl, $R_{15}$ is $C_1$-$C_{20}$alkyl, $R_{16}$ is hydrogen or $C_1$-$C_6$alkyl, $R_{17}$ is $C_1$-$C_{20}$alkyl; oxygen or sulfur interrupted $C_3$-$C_{20}$alkyl; $C_5$-$C_9$cycloalkyl, phenyl, benzyl or tolyl, $R_{18}$ and $R_{19}$ are independently of each other hydrogen or $C_1$-$C_6$alkyl, and n is 1 or 2,
and
where the antistatic agent is selected from the group consisting of ethoxylated alkylamines, ethoxylated dialkylamines, polyglycerol esters, esters of glycerol with $C_8$-$C_{18}$carboxylic acids, pentaerythritol esters, sorbitan esters and mixtures thereof.

2. A composition according to claim 1, where in the sulfur-containing phenolic antioxidant $R_2$ and $R_3$ independently of each other are $C_6$-$C_{18}$alkyl.

3. A composition according to claim 1, wherein the sulfur-containing phenolic antioxidant is

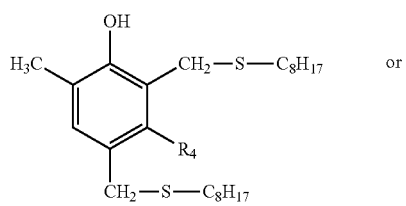

-continued

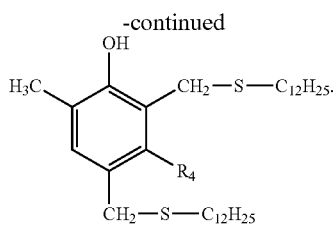

4. A composition according to claim 1, where in the sulfur-containing phenolic antioxidant
$R_1$ is methyl and
$R_2$ and $R_3$ independently of each other are $C_8$-$C_{12}$alkyl.

5. A composition according to claim 1, wherein the migrating antistatic agent is selected from the group consisting of ethoxylated $C_8$-$C_{18}$alkylamines, ethoxylated $C_8$-$C_{18}$dialkylamines, esters of polyglycerol with $C_8$-$C_{18}$carboxylic acids, esters of glycerol with $C_8$-$C_{18}$carboxylic acids, esters of pentaerythritol with $C_8$-$C_{18}$-carboxylic acids, esters of sorbitan with $C_8$-$C_{18}$carboxylic acids and mixtures thereof.

6. A composition according to claim 5, wherein the migrating antistatic agent is selected from the group consisting of ethoxylated $C_8$-$C_{18}$alkylamines, ethoxylated $C_8$-$C_{18}$dialkylamines, polyglycerol stearate, glycerol monostearate, pentaerythritol monostearate, pentaerythritol distearate, sorbitan monopalmitate, sorbitan monostearate, sorbitan monooleate and mixtures thereof.

7. A composition according to claim 1, comprising in addition, besides components (a), (b), (c) and (d), further additives.

8. A composition according to claim 7, comprising as further additives phenolic antioxidants, light-stabilizers and/or processing stabilizers.

9. A process for the preparation of a crosslinked polyethylene composition which comprises heating the composition according to claim 1.

10. A cable insulation of medium or high voltage cables comprising a crosslinked polyethylene prepared according to claim 9.

* * * * *